UNITED STATES PATENT OFFICE 2,097,807

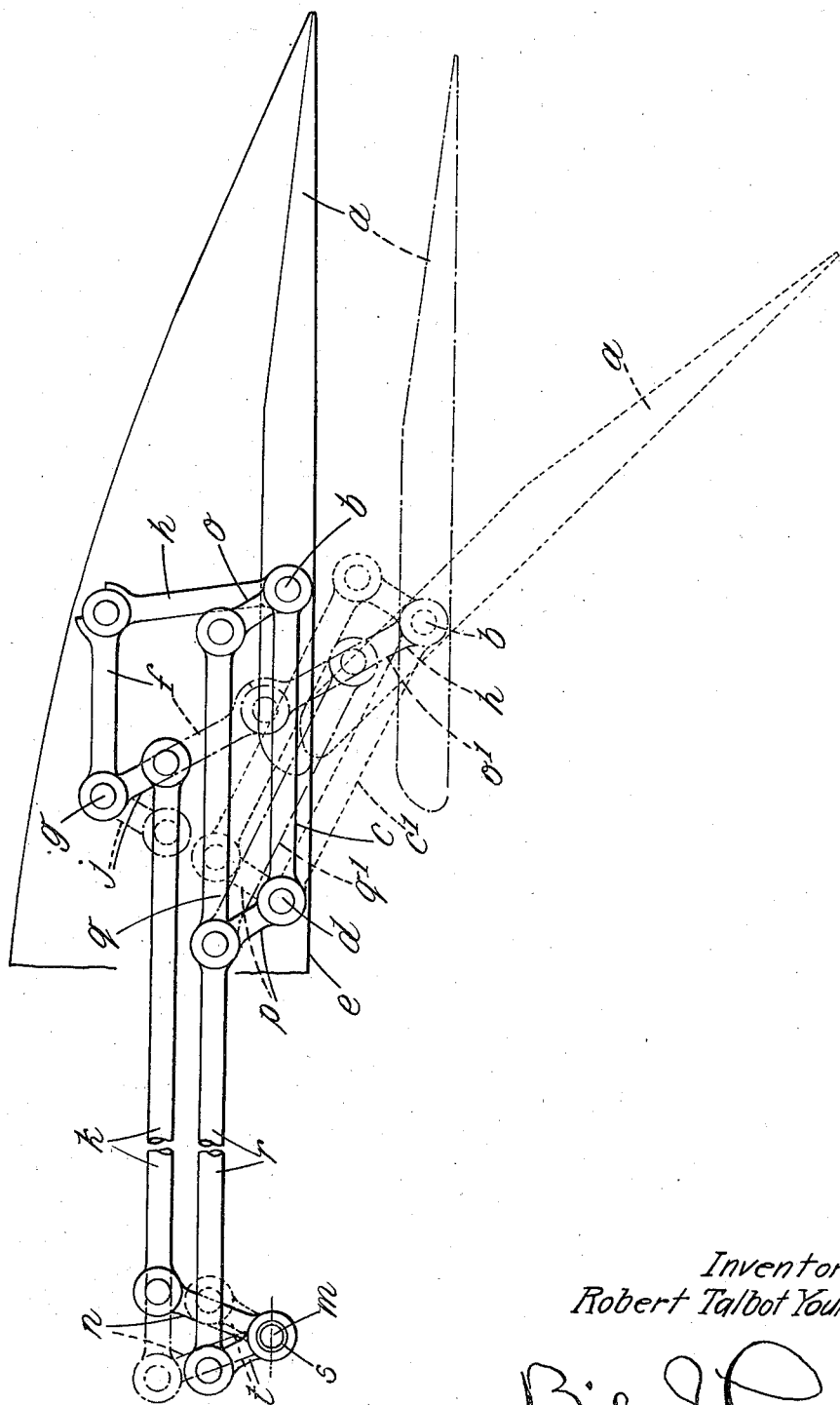

MECHANISM FOR ACTUATING THE CONTROL SURFACES OF AIRCRAFT

Robert Talbot Youngman, Aldershot, England, assignor to The Fairey Aviation Company Limited, Hayes, England Application December 1, 1936, Serial No. 113,657
In Great Britain December 13, 1935

9 Claims. (Cl. 244—42)

Various mechanisms have been proposed for actuating the control surfaces of aircraft, in particular the so-called "flaps" of large aircraft, the operation of which presents difficulties on account of the hinge movements and other complications involved, whether the mechanism be power (e. g. hydraulic, electric) or hand operated, further it has been found that there is a considerable and undesirable time lag in the functioning of such mechanisms.

It has been proposed to mount a flap on an aircraft wing so that it may be lowered bodily from its normal retracted position to a position below the wing level and turned to a desired extent about a transverse axis at or near the centre of pressure, the bodily lowering and turning movements of the flap being effected independently and either successively or simultaneously by means of a deformable parallelogram of links. In accordance with the present invention the flap is moved to its lowered position by a lever which is pivoted at its front end on the aircraft wing and which is part of a link and lever mechanism comprising said lever, a second lever parallel therewith and also pivoted at its front end on the aircraft wing, and a link connecting the free ends of said levers, said second lever and said link together constituting a toggle or knuckle jointed strut, the elements of which, when the flap is moved to its lowered position, are straightened out to form one side of a triangulated structure, a second side of which is formed by the first lever, and the third side of which is constituted by the wing structure between the pivotal axes of the first and second levers.

For example, as shown in the accompanying drawing, which is a fragmentary diagrammatic cross-section on a fore and aft plane of the wing of an aircraft, a flap $a$ is pivotally mounted on a transverse axis $b$ at its centre of pressure on the rear end of a lever $c$ which is pivotally mounted at its front end as at $d$ on the aircraft wing $e$, and means are provided for depressing this lever $c$ and subsequently for turning the flap $a$ about its pivotal axis $b$, these latter means being such that during the first or lowering movement of the flap $a$ it is caused to move through a series of parallel positions, its final lowered position being below but in advance of, its initial position as indicated in broken lines, but if desired, its final lowered position may be either directly below, or below but in rear of, its initial position.

In order adequately to support the flap $a$ against the loads imposed thereon the lever $c$ by which it is moved to its lowered position may be part of a link and lever mechanism comprising said lever $c$, a second lever $f$ parallel therewith and pivoted at its front end as at $g$ on the aircraft wing $e$ and a link $h$ connecting the free or rear ends of said levers $c$ and $f$, said second lever $f$ and said link $h$ together constituting a toggle or knuckle jointed strut, the elements of which, when the flap $a$ is moved to its lowered position, are straightened out to form one side of a triangulated structure, a second side of which is formed by the first lever $c$, and the third side of which is constituted by the wing structure between the pivotal axes $d$ and $g$ of the levers $c$ and $f$.

In order to turn the lever $c$ so as to lower the flap $a$ the lever $f$ may constitute one arm of a bell crank lever $f\ j$ the other arm $j$ of which is connected by a link $k$ with operating means in the cockpit e. g. a torque tube $m$ carrying a radially extending lever $n$ with which the adjacent end of the link $k$ is connected.

In order that the flap $a$, as it is lowered, may be moved through a series of parallel positions, and afterwards, be turned about its pivotal axis $b$, it has rigidly connected therewith a lever $o$ which forms one side of a parallelogram, a second side of which is constituted by the lever $c$, whilst the two other sides are constituted by corresponding members $p\ q$, all four members $c$, $o$, $p$, $q$, being pivotally connected together at the corners of the parallelogram, and with that corner of the parallelogram which is diagonally opposite the pivotal axis $b$ of the flap $a$ is connected a link $r$ by which the obliquity of the parallelogram may be varied. This link $r$ serves to connect the parallelogram with operating means in the cockpit, e. g. a torque tube $s$ carrying a radially extending lever $t$ with which the adjacent end of said link $r$ is connected.

As one member $o$ of the parallelogram is rigidly connected with the flap $a$ it follows that variation in the obliquity of the parallelogram will vary the inclination of that member $o$ to the general plane of the wing $e$ and, consequently, the flap $a$ will be turned about its pivotal axis $b$.

When the torque tube $m$ is turned its movement is transmitted through the lever $n$ to the link $k$, thence, through the bell crank lever $j\ f$ and its associated link $h$, to the lever $c$, with the result that the flap $a$ is lowered and held in its lowered position by a triangulated structure. If the tube $s$ be held stationary the parallelogram must, of necessity, partake of the downward movement of the lever c which is a constituent member thereof, and as the member p of the parallelogram is held fast by its connection with the (stationary) torque tube s the obliquity of the parallelogram is varied as the lever c is depressed, but this variation of obliquity is such that the member o of the parallelogram moves through a series of parallel positions as also does the flap a itself. See the broken line position indicated at o, p, q', c'. This movement of the flap a can be effected manually without undue effort on the part of the pilot and thereafter when the torque tube s is turned its movement is transmitted through the lever t to the link r and to the parallelogram, the obliquity of the latter is again varied and the flap a is turned about its pivotal axis b. This movement of the flap a can be effected manually also without undue effort on the part of the pilot and the two movements may be effected in the minimum time.

Although reference is made above to a first or lowering lever c for the flap a it is to be understood that a pair of such levers may be provided, one at each end, and that by connecting the free ends of this pair of levers by a common shaft a single set of links and levers may transmit thereto the movement of the torque tube m, but if desired the various parts mentioned above may be duplicated at the opposite ends of the flap a. Similarly, the pair of lowering levers such as c may together constitute one side of the parallelogram, the other sides of which and their associated parts are all single elements, or all the elements may be duplicated at the opposite ends of the flap a.

Further it is to be understood that the connections between the cockpit and the flap actuating mechanism may be other than link and lever e. g. sprocket wheels and chains.

I claim:—

1. Mechanism for actuating the control surfaces of aircraft including a flap mounted so that it is lowered bodily from its normal retracted position to a position below the wing level and turned to a desired extent about a transverse axis at or near the centre of pressure, the bodily lowering and turning movements of the flap being effected independently and either successively or simultaneously, wherein a lever by which the flap is moved to its lowered position is pivoted at its front end on the aircraft wing and is part of a link and lever mechanism comprising said lever, a second lever parallel therewith and also pivoted at its front end on the aircraft wing, and a link connecting the free ends of said levers, said second lever and said link together constituting a toggle or knuckle jointed strut, the elements of which, when the flap is moved to its lowered position, are straightened out to form one side of a triangulated structure, a second side of which is formed by the first lever, and the third side of which is constituted by the wing structure between the pivotal axes of the first and second levers.

2. Mechanism for actuating the control surfaces of aircraft, as claimed in claim 1, wherein the second lever constitutes one arm of a bell crank lever, the other arm of which is connected by a link with operating means in the cockpit of the aircraft.

3. Mechanism for actuating the control surfaces of aircraft as claimed in claim 1, wherein the flap has rigidly connected therewith a lever which forms one side of a parallelogram, a second side of which is constituted by the first or lowering lever, whilst the two other sides are constituted by corresponding members, all four members being pivotally connected together at the corners of the parallelogram, and wherein there is connected with that corner of the parallelogram which is diagonally opposite the pivotal axis of the flap a link by which the obliquity of the parallelogram may be varied.

4. Mechanism for actuating the control surfaces of aircraft including a flap mounted so that it is lowered bodily from its normal retracted position to a position below the wing level and turned to a desired extent about a transverse axis at or near the centre of pressure, the bodily lowering and turning movements of the flap being effected independently and either successively or simultaneously, wherein a lever by which the flap is moved to its lowered position is pivoted at its front end on the aircraft wing and is part of a link and lever mechanism comprising said lever, a second lever parallel therewith and also pivoted at its front end on the aircraft wing, and a link connecting the free ends of said levers, said second lever and said link together constituting a toggle or knuckle jointed strut, the elements of which, when the flap is moved to its lowered position, are straightened out to form one side of a triangulated structure, a second side of which is formed by the first lever, and the third side of which is constituted by the wing structure between the pivotal axes of the first and second levers, wherein said second lever constitutes one arm of a bell crank lever, the other arm of which is connected by a link with operating means in the cockpit of the aircraft, wherein the flap has rigidly connected therewith a lever which forms one side of a parallelogram, a second side of which is constituted by the first or lowering lever, whilst the two other sides are constituted by corresponding members, all four members being pivotally connected together at the corners of the parallelogram, and wherein there is connected with that corner of the parallelogram which is diagonally opposite the pivotal axis of the flap a link by which the obliquity of the parallelogram may be varied.

5. A mechanism for the control of aircraft including a wing, a flap mounted on said wing, means for bodily moving said flap from a normal retracted position to a position below the wing level, means mounting said flap for pivotal movement about a transverse axis substantially at the center of pressure independently of the movement of said first means, said moving means comprising a lever pivotally secured at one end to said wing, a second lever parallel with said first lever and pivotally secured at one end to said wing, and a link connecting the free ends of said levers, said second lever and said link together forming a toggle or knuckle jointed strut, the angularity of said second lever and said link relative to each other being increased when the flap is moved to its lowered position until they extend in the same axial direction so as to form one side of a triangular structure, the second side of said triangle being formed by said first lever and the third side by the wing structure between the pivotal axes of said first and second levers.

6. In a mechanism for the control of aircraft as claimed in claim 5, control means for said moving means comprising an element positioned in the cockpit of the aircraft, an arm secured at one end to said second lever at the end thereof which is pivoted on the wing and forming a bell crank lever therewith, and a link connecting the other end of said arm with said element.

7. In a mechanism for the control of aircraft as claimed in claim 5, means for pivoting said flap about its axis comprising a third lever rigidly secured at one end thereof to said flap at its pivotal axis and forming one side of a parallelogram, said first lever being pivoted to said flap at the point of connection of said third lever and forming the second side of said parallelogram, and two members forming the third and fourth sides of said parallelogram pivotally secured together and to said first and third levers respectively, and a link connected to the corner of the parallelogram positioned diagonally opposite the pivotal axis of said flap for varying the obliquity of the parallelogram.

8. A mechanism for the control of aircraft including a wing, a flap mounted on said wing, means for bodily moving said flap from a normal retracted position to a position below the wing level, means for mounting said flap for pivotal movement about a transverse axis substantially at the center of pressure independently of the movement of said first means, said moving means comprising a lever pivotally secured at one end to said wing, a second lever parallel with said first lever and pivotally secured at one end to said wing, and a link connecting the free ends of said levers, said second lever and said link together forming a toggle or knuckle jointed strut, the angularity of said second lever and said link relative to each other being increased when the flap is moved to its lowered position until they extend in the same axial direction so as to form one side of a triangular structure, the second side of said triangle being formed by said first lever and the third side by the wing structure between the pivotal axes of said first and second levers, control means for said moving means comprising an element positioned in the cockpit of the aircraft, an arm secured at one end to said second lever at the end thereof which is pivoted on the wing and forming a bell crank lever therewith, and a link connecting the other end of said arm with said element, means for pivoting said flap about its axis comprising a third lever rigidly secured at one end thereof to said flap at its pivotal axis and forming one side of a parallelogram, said first lever being pivoted to said flap at the point of connection of said third lever and forming the second side of said parallelogram, and two members forming the third and fourth sides of said parallelogram, pivotally secured together and to said first and third levers, respectively, and a link connected to the corner of the parallelogram positioned diagonally opposite the pivotal axis of said flap for varying the obliquity of the parallelogram.

9. A mechanism for the control of aircraft including a wing, a flap mounted on said wing, means for bodily moving said flap from a normal retracted position to a position below the wing level, said moving means comprising a lever pivotally secured at one end to said wing, a second lever parallel with said first lever and pivotally secured at one end to said wing, and a link connecting the free ends of said levers, said second lever and said link together forming a toggle or knuckle jointed strut, the angularity of said second lever and said link relative to each other being increased when the flap is moved to its lowered position until they extend in the same axial direction so as to form one side of a triangular structure, the second side of said triangle being formed by said first lever and the third side by the wing structure between the pivotal axes of said first and second levers, control means for said moving means comprising an element positioned in the cockpit of the aircraft, an arm secured at one end to said second lever at the end thereof which is pivoted on the wing and forming a bell crank lever therewith, and a link connecting the other end of said arm with said element.

ROBERT TALBOT YOUNGMAN.